US012706017B2

(12) United States Patent
Pyun et al.

(10) Patent No.: US 12,706,017 B2
(45) Date of Patent: Aug. 11, 2026

(54) DISPLAY DEVICE INCLUDING A LOAD SWITCH, AND ELECTRONIC DEVICE

(71) Applicant: Samsung Display Co., LTD., Yongin-si (KR)

(72) Inventors: Kihyun Pyun, Yongin-si (KR); Dae-Sik Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/044,482

(22) Filed: Feb. 3, 2025

(65) Prior Publication Data

US 2025/0372023 A1 Dec. 4, 2025

(30) Foreign Application Priority Data

May 28, 2024 (KR) ........................ 10-2024-0069001

(51) Int. Cl.

*G09G 3/20* (2006.01)
*G09G 3/00* (2006.01)
*G09G 3/3233* (2016.01)

(52) U.S. Cl.

CPC ........... *G09G 3/2092* (2013.01); *G09G 3/006* (2013.01); *G09G 3/3233* (2013.01); *G09G 2300/0842* (2013.01); *G09G 2330/025* (2013.01); *G09G 2330/026* (2013.01); *G09G 2330/04* (2013.01); *G09G 2330/12* (2013.01)

(58) Field of Classification Search

CPC .... G09G 3/2092; G09G 3/006; G09G 3/3233; G09G 2300/0842; G09G 2330/025; G09G 2330/026; G09G 2330/04; G09G 2330/12

See application file for complete search history.

(56) References Cited

U.S. PATENT DOCUMENTS

| | | | | |
|---|---|---|---|---|
| 9,942,957 B1 * | 4/2018 | Lin | ........................ | H05B 45/00 |
| 2008/0031025 A1 * | 2/2008 | Wang | .................... | H02M 3/156 363/78 |
| 2014/0025978 A1 * | 1/2014 | Tokunaga | ................. | G06F 1/30 713/323 |
| 2015/0180244 A1 * | 6/2015 | Jung | ................... | H02J 7/00047 320/137 |
| 2022/0284855 A1 * | 9/2022 | Kang | ................... | G09G 3/3233 |
| 2022/0415231 A1 * | 12/2022 | Lee | .......................... | G09G 3/20 |
| 2023/0221745 A1 * | 7/2023 | Tseng | ...................... | G05F 1/561 323/280 |

FOREIGN PATENT DOCUMENTS

| | | |
|---|---|---|
| KR | 10-0893482 B1 | 4/2009 |
| KR | 10-0894606 B1 | 4/2009 |
| KR | 10-1968342 B1 | 4/2019 |
| KR | 10-2619139 B1 | 12/2023 |

* cited by examiner

*Primary Examiner* — Nitin Patel
*Assistant Examiner* — Gloryvid Figueroa-Gibson
(74) *Attorney, Agent, or Firm* — Womble Bond Dickinson (US) LLP

(57) ABSTRACT

A display device includes a display panel including pixels, a low-dropout circuit configured to generate an internal power supply voltage in response to a low-dropout enable signal, and to provide the internal power supply voltage to the pixels through a power supply line, a load switch circuit configured to receive an external power supply voltage, and to selectively provide the external power supply voltage to the power supply line in response to a load switch enable signal, and a controller configured to generate the low-dropout enable signal and the load switch enable signal.

18 Claims, 11 Drawing Sheets

DISPLAY DEVICE INCLUDING A LOAD SWITCH, AND ELECTRONIC DEVICE

CROSS-REFERENCE TO RELATED APPLICATION

The present application claims priority to, and the benefit of, Korean Patent Application No. 10-2024-0069001, filed on May 28, 2024, in the Korean Intellectual Property Office, the entire disclosure of which is incorporated herein by reference.

BACKGROUND

1. Field

Embodiments of the present disclosure relate to a display device including a load switch, and an electronic device including the display device.

2. Description of the Related Art

In general, a display device may include a power supply circuit that generates a power supply voltage for a plurality of pixels based on an external input voltage, and the plurality of pixels may emit light based on the power supply voltage generated by the power supply circuit within the display device. The external input voltage may be a voltage higher than the power supply voltage generated by the power supply circuit. That is, the external power supply circuit may generate the external input voltage higher than the power supply voltage for the plurality of pixels.

Recently, to reduce power consumption, etc., the display device may not include the power supply circuit that generates the power supply voltage, and the external power supply circuit may generate the power supply voltage. In this case, the plurality of pixels may directly receive the power supply voltage generated by the external power supply circuit. However, although the external power supply circuit has high efficiency, the power supply voltage generated by the external power supply circuit may have ripples.

SUMMARY

Some embodiments provide a display device that selectively uses an internal power supply voltage or an external power supply voltage.

Some embodiments provide an electronic device including a display device that selectively uses an internal power supply voltage or an external power supply voltage.

According to embodiments, there is provided a display device including a display panel including pixels, a low-dropout circuit configured to generate an internal power supply voltage in response to a low-dropout enable signal, and to provide the internal power supply voltage to the pixels through a power supply line, a load switch circuit configured to receive an external power supply voltage, and to selectively provide the external power supply voltage to the power supply line in response to a load switch enable signal, and a controller configured to generate the low-dropout enable signal and the load switch enable signal.

The controller may be configured to activate the low-dropout enable signal in a power-on period of the display device, wherein the low-dropout circuit is configured to provide the internal power supply voltage to the power supply line in response to the activated low-dropout enable signal, and to perform an overcurrent detection operation for determining whether a current flowing through the power supply line is greater than or equal to a reference current.

The controller may be configured to deactivate the load switch enable signal in the power-on period, wherein the load switch circuit is configured to reduce or block the external power supply voltage to the power supply line in response to the deactivated load switch enable signal.

The controller may be configured to deactivate the low-dropout enable signal, and is configured to activate the load switch enable signal, in a driving period after the power-on period, wherein the low-dropout circuit is configured to reduce or block the internal power supply voltage to the power supply line in response to the deactivated low-dropout enable signal, wherein the load switch circuit is configured to provide the external power supply voltage to the power supply line in response to the activated load switch enable signal, and wherein the pixels are configured to receive the external power supply voltage through the power supply line, and to emit light based on the external power supply voltage.

The controller may be configured to activate the low-dropout enable signal in a sensing period in which characteristics of the pixels are sensed, wherein the low-dropout circuit is configured to provide the internal power supply voltage to the power supply line in response to the activated low-dropout enable signal.

The controller may be configured to deactivate the load switch enable signal in the sensing period, wherein the load switch circuit is configured to reduce or block the external power supply voltage to the power supply line in response to the deactivated load switch enable signal.

The display device may further include a sensing circuit connected to the pixels through sensing lines, and configured to sense the characteristics of the pixels in the sensing period.

The controller may be configured to deactivate the load switch enable signal in response to an abnormal event of the display panel being detected, wherein the load switch circuit is configured to reduce or block the external power supply voltage to the power supply line in response to the deactivated load switch enable signal.

The abnormal event may include an overcurrent of the display panel.

The load switch circuit may include a first transistor connected between the power supply line and an external power supply circuit configured to generate the external power supply voltage, and a second transistor configured to selectively turn on the first transistor in response to the load switch enable signal.

The first transistor may include a P-type metal oxide semiconductor (PMOS) transistor, wherein the second transistor includes an N-type bipolar junction transistor (BJT).

The load switch circuit may further include a first resistor including a first terminal configured to receive the load switch enable signal, and a second terminal connected to a control electrode of the second transistor, a second resistor connected between a first terminal of the second transistor and a control electrode of the first transistor, a capacitor connected between a first terminal of the first transistor and the second resistor, and a third resistor connected in parallel with the capacitor.

The first transistor may include the control electrode connected to the second resistor, the first terminal connected to the external power supply circuit, and a second terminal connected to the power supply line, wherein the second transistor includes the control electrode connected to the first resistor, the first terminal connected to the second resistor, and a second terminal configured to receive a ground voltage.

The external power supply circuit may include a switching mode power supply (SMPS) circuit in a host device.

The load switch circuit may include first transistors connected in parallel between the power supply line and an external power supply circuit configured to generate the external power supply voltage, and a second transistor configured to selectively turn on the first transistors in response to the load switch enable signal.

A number of the first transistors may correspond to an amount of current flowing through the power supply line.

According to embodiments, there is provided a display device including a display panel including pixels, a low-dropout circuit configured to generate an internal power supply voltage in response to a low-dropout enable signal, and to provide the internal power supply voltage to the pixels through a power supply line, a load switch circuit configured to receive an external power supply voltage, and to selectively provide the external power supply voltage to the power supply line in response to a load switch enable signal, and including a first transistor including a control electrode, a first terminal connected to an external power supply circuit configured to generate the external power supply voltage, and a second terminal connected to the power supply line, a first resistor, a second transistor including a control electrode configured to receive the load switch enable signal through the first resistor, a first terminal, and a second terminal configured to receive a ground voltage, a second resistor connected between the first terminal of the second transistor and the control electrode of the first transistor, a capacitor connected between the first terminal of the first transistor and the second resistor, and a third resistor connected in parallel with the capacitor, and a controller configured to generate the low-dropout enable signal and the load switch enable signal.

The controller may be configured to activate the low-dropout enable signal, and is configured to deactivate the load switch enable signal, in a power-on period or a sensing period of the display device.

According to embodiments, there is provided an electronic device including a host device including an external power supply circuit configured to generate an external power supply voltage, and a display device configured to receive input image data and the external power supply voltage from the host device, and including a display panel including pixels, a low-dropout circuit configured to generate an internal power supply voltage in response to a low-dropout enable signal, and to provide the internal power supply voltage to the pixels through a power supply line, a load switch circuit configured to receive the external power supply voltage, and to selectively provide the external power supply voltage to the power supply line in response to a load switch enable signal, and a controller configured to generate the low-dropout enable signal and the load switch enable signal.

The controller may be configured to activate the low-dropout enable signal, and is configured to deactivate the load switch enable signal, in a power-on period or a sensing period of the display device.

The electronic device may include a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

As described above, in a display device and an electronic device according to embodiments, a low-dropout circuit may provide an internal power supply voltage to a power supply line in response to a low-dropout enable signal, and a load switch circuit may selectively provide an external power supply voltage to the power supply line in response to a load switch enable signal. Accordingly, while the low-dropout circuit provides the internal power supply voltage to a plurality of pixels, the external power supply voltage provided from the external power supply circuit may be reduced or blocked.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
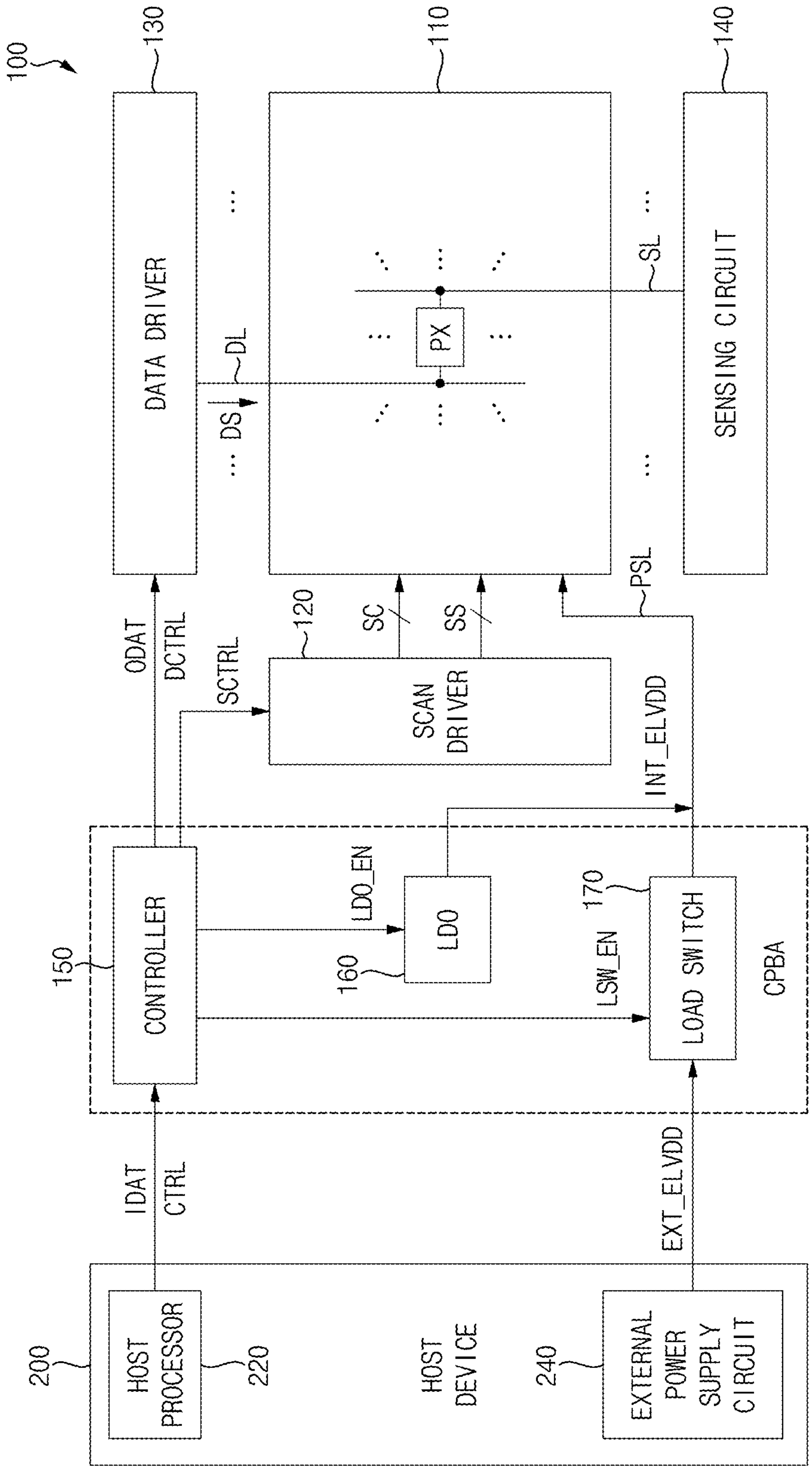
FIG. 1 is a block diagram illustrating a display device according to embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
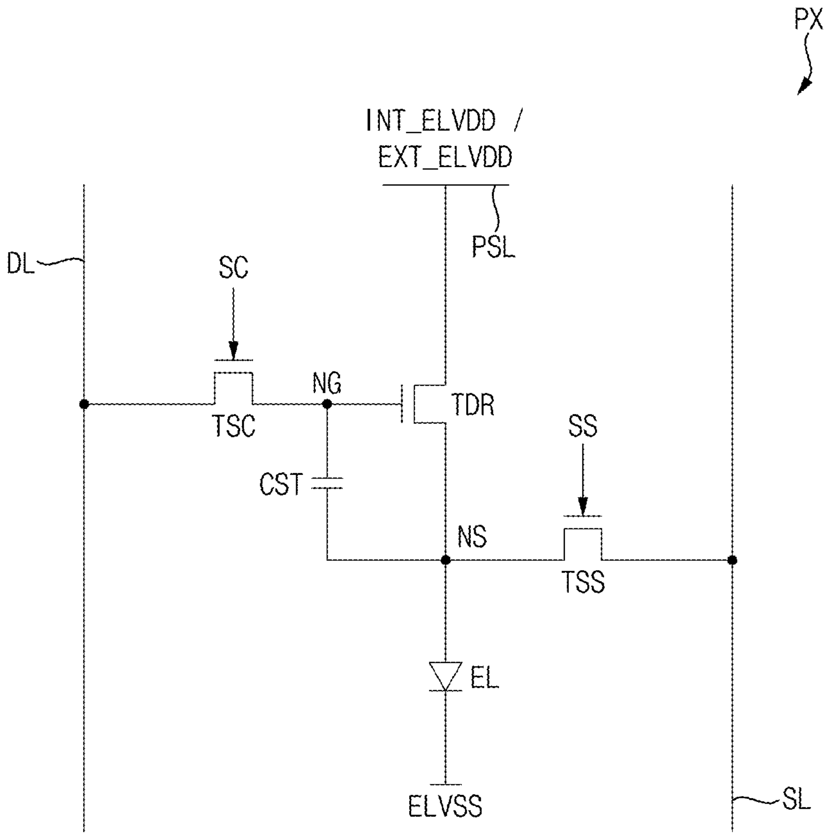
FIG. 2 is a circuit diagram illustrating an example of a pixel included in a display device according to embodiments.
Figure 3:
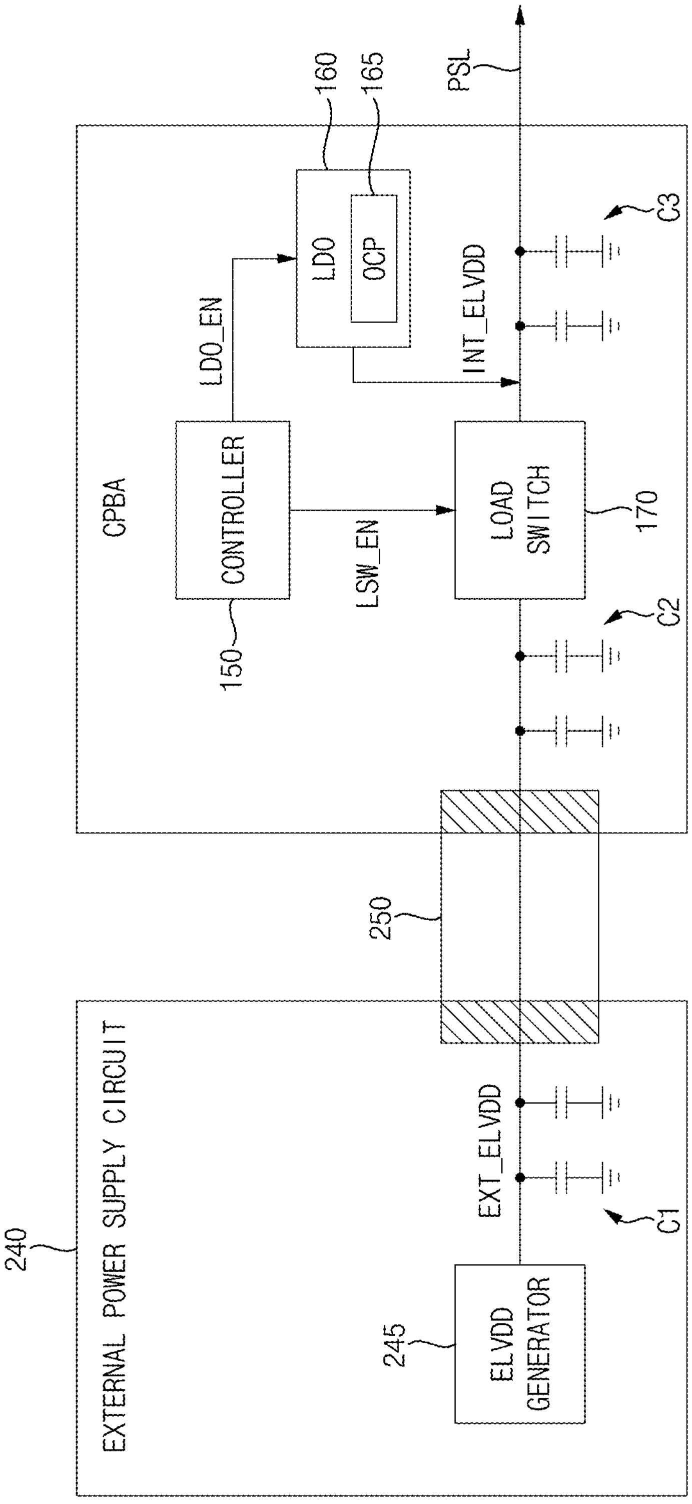
FIG. 3 is a diagram illustrating an example of an external power supply circuit and a control board of a display device.
Figure 4:
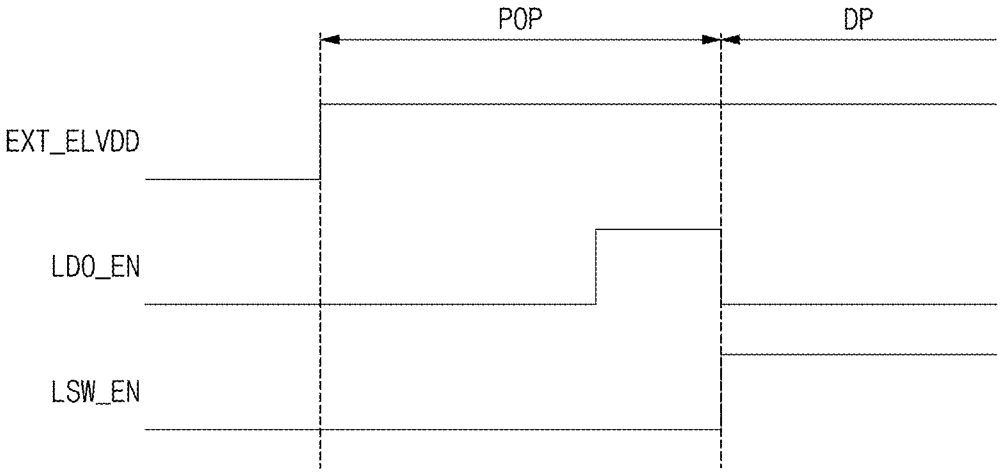
FIG. 4 is a timing diagram illustrating an example of a power-on sequence of a display device.
Figure 5:
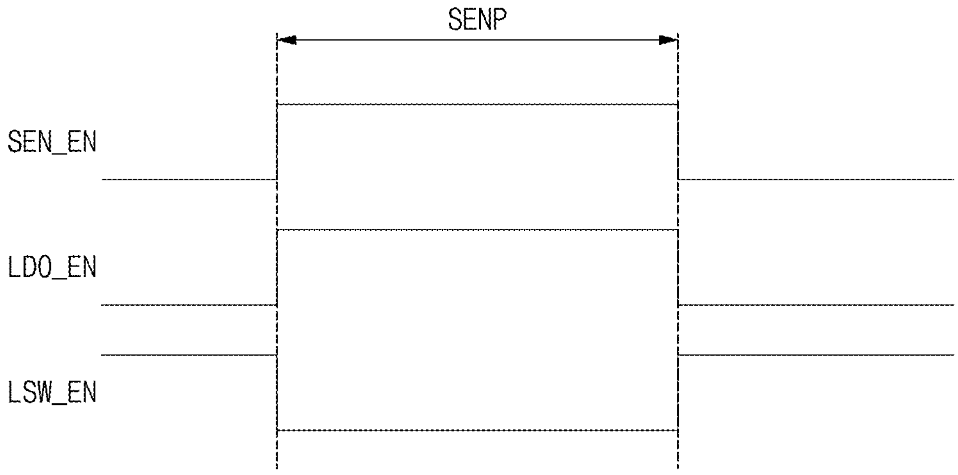
FIG. 5 is a timing diagram illustrating an example of a sensing sequence of a display device.
Figure 6A:
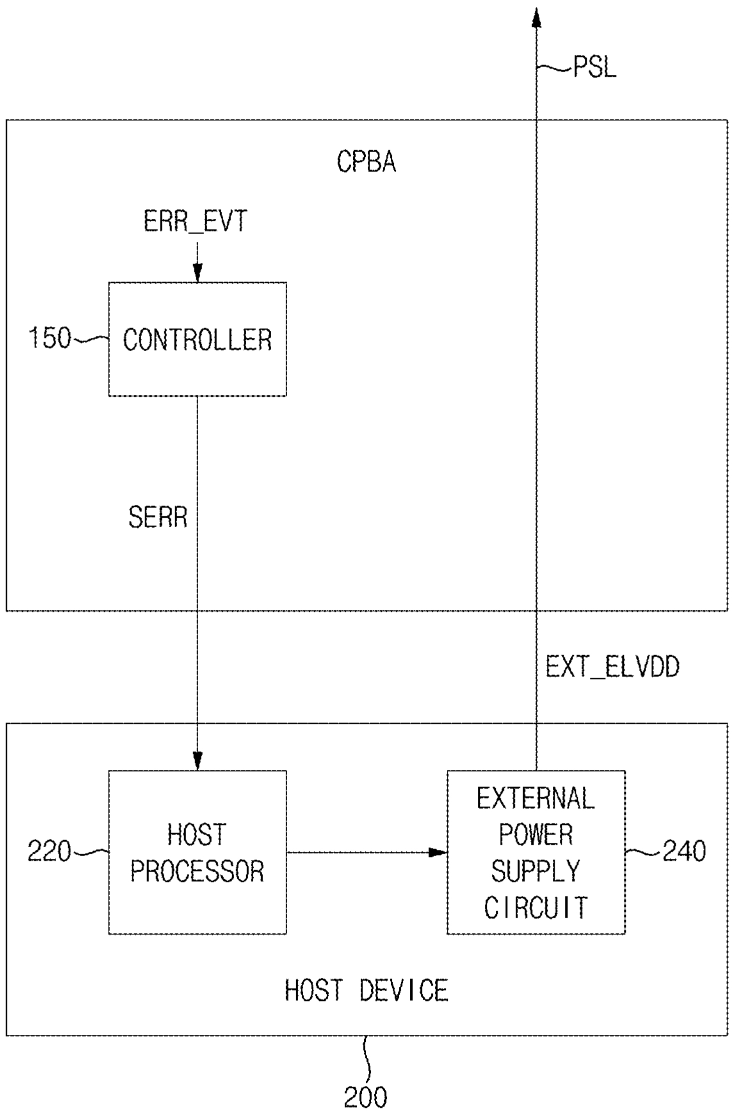
FIG. 6A is a block diagram illustrating an example of a host device and a control board in a case where a display device does not include a load switch.
Figure 6B:
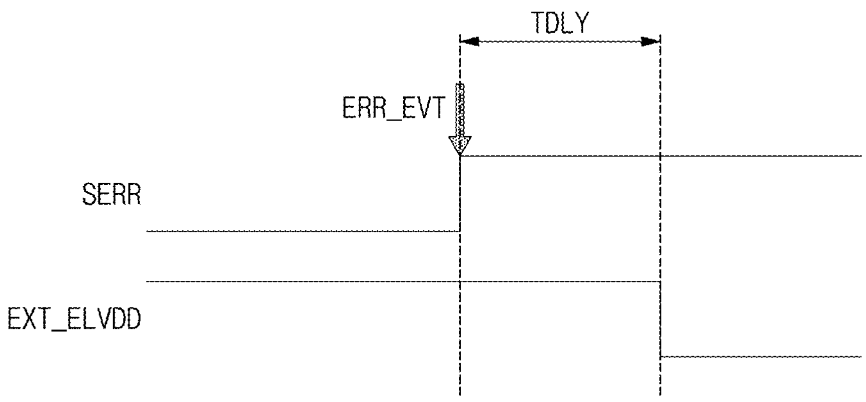
FIG. 6B is a timing diagram for describing an example of a power supply voltage when an abnormal event occurs in the case where the display device does not include the load switch.
Figure 7A:
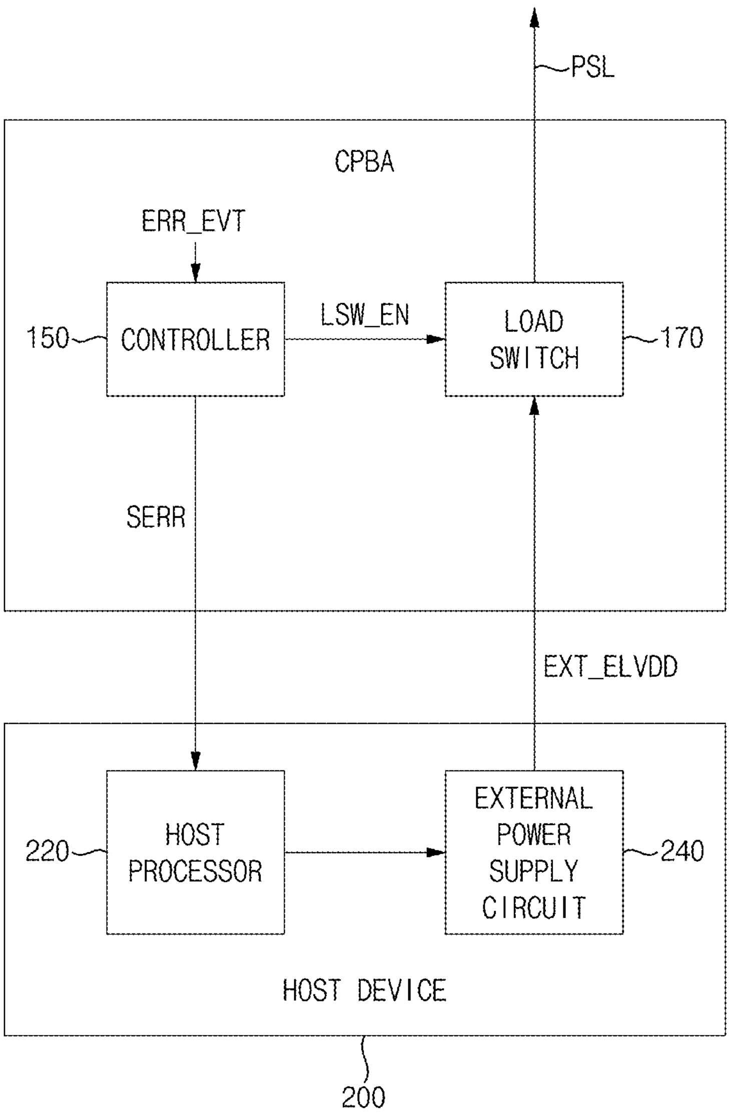
FIG. 7A is a block diagram illustrating an example of a host device and a control board according to embodiments.
Figure 7B:
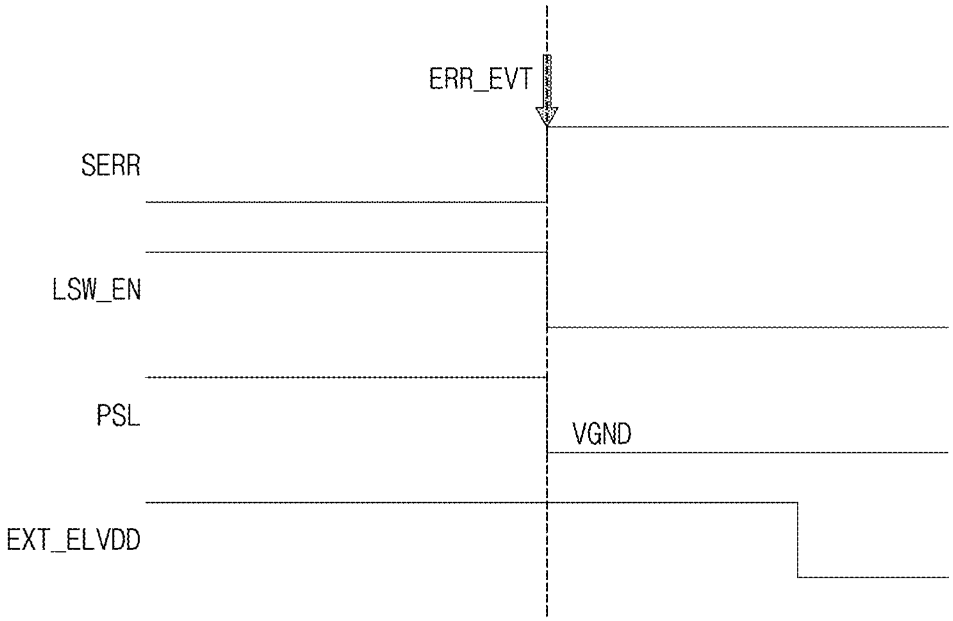
FIG. 7B is a timing diagram for describing an example of a power supply voltage when an abnormal event occurs according to embodiments.

FIG. 1 is a block diagram illustrating a display device according to embodiments, FIG. 2 is a circuit diagram illustrating an example of a pixel included in a display device according to embodiments, FIG. 3 is a diagram illustrating an example of an external power supply circuit and a control board of a display device, FIG. 4 is a timing diagram illustrating an example of a power-on sequence of a display device, FIG. 5 is a timing diagram illustrating an example of a sensing sequence of a display device, FIG. 6A is a block diagram illustrating an example of a host device and a control board in a case where a display device does not include a load switch, FIG. 6B is a timing diagram for describing an example of a power supply voltage when an abnormal event occurs in the case where the display device does not include the load switch, FIG. 7A is a block diagram illustrating an example of a host device and a control board according to embodiments, and FIG. 7B is a timing diagram for describing an example of a power supply voltage when an abnormal event occurs according to embodiments.

Referring to FIG. 1, a display device 100 according to embodiments may include a display panel 110 that includes a plurality of pixels PX, a low-dropout circuit 160 that provides an internal power supply voltage INT_ELVDD to the plurality of pixels PX through a power supply line PSL in response to a low-dropout enable signal LDO_EN, a load switch circuit 170 that provides an external power supply voltage EXT_ELVDD to the plurality of pixels PX through the power supply line PSL in response to a load switch enable signal LSW_EN, and a controller 150 that generates the low-dropout enable signal LDO_EN and the load switch enable signal LSW_EN and that controls an operation of the display device 100. In some embodiments, the display device 100 may further include a scan driver 120 that provides scan signals SC and sensing signals SS to the plurality of pixels PX, a data driver 130 that provides data signals DS to the plurality of pixels PX through a plurality of data lines DL, and a sensing circuit 140 that senses characteristics of the plurality of pixels PX through a plurality of sensing lines SL.

The display panel 110 may include the plurality of data lines DL, the plurality of sensing lines SL, and a plurality of pixels PX connected to the plurality of data lines DL and the plurality of sensing lines SL. The display panel 110 may further include a plurality of scan signal lines for providing the scan signals SC to the plurality of pixels PX, and sensing signal lines for providing the sensing signals SS to the plurality of pixels PX. In addition, the display panel 110 may further include the power supply line PSL for providing the internal power supply voltage INT_ELVDD or the external power supply voltage EXT_ELVDD to the plurality of pixels PX. For example, the power supply line PSL may have a mesh shape, but is not limited thereto. Further, in some embodiments, the internal and external power supply voltages INT_ELVDD and EXT_ELVDD may be high power supply voltages, and the display panel 110 may further include a low power supply line for providing a low power supply voltage ELVSS illustrated in FIG. 2 to the plurality of pixels PX.

In some embodiments, each pixel PX may include a light-emitting element, and the display panel 110 may be a light-emitting display panel. For example, as illustrated in FIG. 2, each pixel PX may include a driving transistor TDR, a scan transistor TSC, a sensing transistor TSS, a storage capacitor CST and a light-emitting element EL.

The storage capacitor CST may store the data signal DS transferred through the data line DL. In some embodiments, the storage capacitor CST may include a first electrode connected to a gate node NG, and a second electrode connected to a source node NS.

The scan transistor TSC may connect the data line DL to the gate node NG in response to the scan signal SC. Thus, the scan transistor TSC may transfer the data signal DS of the data line DL to the gate node NG in response to the scan signal SC. In some embodiments, the scan transistor TSC may include a gate, which receives the scan signal SC, a first terminal connected to the data line DL, and a second terminal connected to the gate node NG.

The sensing transistor TSS may connect the sensing line SL to the source node NS in response to the sensing signal SS. In some embodiments, the sensing transistor TSS may include a gate, which receives the sensing signal SS, a first terminal connected to the sensing line SL, and a second terminal connected to the source node NS.

The driving transistor TDR may generate a driving current based on the data signal DS stored in the storage capacitor CST. In some embodiments, the driving transistor TDR may include a gate connected to the gate node NG, a first terminal (e.g., a drain) connected to the power supply line PSL, which transfers the internal power supply voltage INT_ELVDD or the external power supply voltage EXT_ELVDD, and a second terminal (e.g., a source) connected to the source node NS.

The light-emitting element EL may emit light based on the driving current generated by the driving transistor TDR. In some embodiments, the light-emitting element EL may be, but is not limited to, an organic light-emitting diode ("OLED"). In other embodiments, the light-emitting element EL may be a quantum dot ("QD") light-emitting diode, a micro light-emitting diode, a nano light-emitting diode ("NED"), an inorganic light-emitting diode, or any other suitable light-emitting element. In some embodiments, the light-emitting element EL may include an anode connected to the source node NS, and a cathode connected to the low power supply line, which transfers the low power supply voltage ELVSS.

Although FIG. 2 illustrates an example of the pixel PX, the pixel PX of the display device 100 according to embodiments is not limited to the example of FIG. 2.

The scan driver 120 may generate the scan signals SC and the sensing signals SS based on a scan control signal SCTRL received from the controller 150, and may sequentially provide the scan signals SC and sensing signals SS to the plurality of pixels PX on a row-by-row basis. In some embodiments, the scan control signal SCTRL may include, but is not limited to, a start signal and a clock signal. In some embodiments, the scan driver 120 may be integrated or formed in the display panel 110. In other embodiments, the scan driver 120 may be implemented with one or more integrated circuits.

The data driver 130 may generate the data signals DS based on output image data ODAT and a data control signal DCTRL received from the controller 150, and may provide the data signals DS to the plurality of pixels PX through the plurality of data lines DL. In some embodiments, the data control signal DCTRL may include, but is not limited to, a data enable signal, a horizontal start signal, a load signal, etc. In some embodiments, the data driver 130 may be implemented with one or more integrated circuits. The integrated circuit of the data driver 130 may be mounted on a source board, but is not limited thereto. In other embodiments, the data driver 130 and the controller 150 may be implemented as a single integrated circuit, and the single integrated circuit may be referred to as a timing-controller-embedded data driver ("TED").

The sensing circuit 140 may sense the characteristics of the plurality of pixels PX through the plurality of sensing lines SL. For example, the sensing circuit 140 may sense a driving characteristic (e.g., mobility and/or a threshold voltage) of the driving transistor TDR by measuring a current (or a voltage) of each pixel PX through the sensing line SL, but is not limited thereto. Further, for example, the sensing circuit 140 may include an analog-to-digital converter ("ADC") that converts the current (or the voltage) of each pixel PX into sensing data, and may provide the sensing data to the controller 150. In some embodiments, the sensing circuit 140 may be implemented as an integrated circuit separate from the integrated circuit of the data driver 130. In other embodiments, the sensing circuit 140 may be included in the data driver 130, or may be included in the controller 150.

The controller 150 (e.g., a timing controller) may receive input image data IDAT and a control signal CTRL from a host processor 220 (e.g., a system-on-chip ("SOC"), an application processor ("AP"), a graphics processing unit ("GPU"), or a graphics card) of a host device 200. In some embodiments, the control signal CTRL may include, but is not limited to, a vertical synchronization signal, a horizontal synchronization signal, an input data enable signal, a master clock signal, etc. The controller 150 may generate the output image data ODAT by correcting the input image data IDAT based on the sensing data received from the sensing circuit 140. Further, the controller 150 may generate the data control signal DCTRL and the scan control signal SCTRL based on the control signal CTRL. The controller 150 may control an operation of the scan driver 120 by providing the scan control signal SCTRL to the scan driver 120, and may control an operation of the data driver 130 by providing the output image data ODAT and the data control signal DCTRL to the data driver 130. Further, the controller 150 may generate the low-dropout enable signal LDO_EN for controlling the low-dropout ("LDO") circuit 160 and the load switch enable signal LSW_EN for controlling the load switch circuit 170.

The low-dropout circuit 160 may generate the internal power supply voltage INT_ELVDD in response to the low-dropout enable signal LDO_EN. For example, the low-dropout circuit 160 may include, but is not limited to, a reference voltage generator that generates a reference voltage, and a low-dropout regulator that performs a low-dropout voltage regulating operation for the reference voltage to generate the internal power supply voltage INT_ELVDD. The low-dropout circuit 160 may provide the internal power supply voltage INT_ELVDD to the plurality of pixels PX through the power supply line PSL. In some embodiments, as illustrated in FIG. 3, the low-dropout circuit 160 may further include an overcurrent protection ("OCP") circuit 165 that performs an overcurrent detection operation that determines whether a current flowing through the power supply line PSL is greater than or equal to a reference current.

The load switch circuit 170 may receive the external power supply voltage EXT_ELVDD from an external power supply circuit 240 of the host device 200, and may selectively provide the external power supply voltage EXT_ELVDD to the power supply line PSL in response to the load switch enable signal LSW_EN. For example, the load switch circuit 170 may provide the external power supply voltage EXT_ELVDD to the power supply line PSL while the load switch enable signal LSW_EN is activated, and may reduce, block, or prevent the external power supply voltage EXT_ELVDD being provided to the power supply line PSL while the load switch enable signal LSW_EN is deactivated.

In some embodiments, the controller 150, the low-dropout circuit 160 and the load switch circuit 170 may be mounted or included in a control board CPBA (e.g., a controller printed circuit board assembly). For example, as illustrated in FIG. 3, the external power supply circuit 240 of the host device 200 may include a power supply voltage generator 245 that generates the external power supply voltage EXT_ELVDD, and at least one first capacitor C1 for stabilizing the external power supply voltage EXT_ELVDD or for reducing a ripple of the external power supply voltage EXT_ELVDD. In some embodiments, the external power supply circuit 240 (or the power supply voltage generator 245 of the external power supply circuit 240) may be implemented as a switching mode power supply ("SMPS") circuit having relatively high power conversion efficiency compared with the low-dropout circuit 160. However, the external power supply voltage EXT_ELVDD generated by the external power supply circuit 240 may have a relatively large ripple compared with the internal power supply voltage INT_ELVDD generated by the low-dropout circuit 160.

The external power supply circuit 240 may be connected to the control board CPBA through a connector 250, and the load switch circuit 170 of the control board CPBA may receive the external power supply voltage EXT_ELVDD from the external power supply circuit 240 through the connector 250. In some embodiments, the control board CPBA may include the controller 150, the low-dropout circuit 160, the load switch circuit 170, at least one second capacitor C2 located between the connector 250 and the load switch circuit 170, and at least one third capacitor C3 connected to the power supply line PSL. The second capacitor C2 may stabilize (or may reduce the ripple of) the external power supply voltage EXT_ELVDD received through the connector 250, and the third capacitor C3 may stabilize (or may reduce the ripple of) the internal power supply voltage INT_ELVDD or the external power supply voltage EXT_ELVDD transferred through the power supply line PSL. The low-dropout circuit 160 performing the low-dropout voltage regulating operation may have relatively low power conversion efficiency compared with the external power supply circuit 240 performing the switching mode conversion operation, but the internal power supply voltage INT_ELVDD generated by the low-dropout circuit 160 may have a relatively small ripple compared with the external power supply voltage EXT_ELVDD generated by the external power supply circuit 240.

In the display device 100 according to embodiments, the internal power supply voltage INT_ELVDD having the relatively small ripple or the external power supply voltage EXT_ELVDD generated by the external power supply circuit 240 having the relatively high power conversion efficiency may be selectively provided to the plurality of pixels PX through the power supply line PSL.

In some embodiments, the display device 100 may provide the internal power supply voltage INT_ELVDD to the plurality of pixels PX in a power-on period of the display device 100. For example, as illustrated in FIG. 4, in the power-on period POP, the external power supply circuit 240 may activate the external power supply voltage EXT_ELVDD, and may provide the activated external power supply voltage EXT_ELVDD to the display device 100. The controller 150 may activate the low-dropout enable signal LDO_EN (e.g., to a high level) within the power-on period POP, and the low-dropout circuit 160 may provide the internal power supply voltage INT_ELVDD to the power supply line PSL in response to the activated low-dropout enable signal LDO_EN. Further, the overcurrent protection circuit 165 of the low-dropout circuit 160 may perform the overcurrent detection operation that determines whether the current flowing through the power supply line PSL is greater than or equal to the reference current in response to the activated low-dropout enable signal LDO_EN. In addition, in the power-on period POP, the controller 150 may deactivate the load switch enable signal LSW_EN (e.g., to a low level), and the load switch circuit 170 may reduce, block, or prevent the external power supply voltage EXT_ELVDD being provided to the power supply line PSL in response to the deactivated load switch enable signal LSW_EN. Accordingly, in the power-on period POP, the external power supply voltage EXT_ELVDD may not be provided to the power supply line PSL, and an abnormal event of the display panel 110, such as an overcurrent of the display panel 110, may be detected.

In a driving period DP in which the display panel 110 displays an image after the power-on period POP, the controller 150 may deactivate the low-dropout enable signal LDO_EN, and may activate the load switch enable signal LSW_EN. The low-dropout circuit 160 may stop generating the internal power supply voltage INT_ELVDD in response to the deactivated low-dropout enable signal LDO_EN, and may not provide the internal power supply voltage INT_ELVDD to the power supply line PSL. Further, the load switch circuit 170 may provide the external power supply voltage EXT_ELVDD to the power supply line PSL in response to the activated load switch enable signal LSW_EN. The plurality of pixels PX may receive the external power supply voltage EXT_ELVDD through the power supply line PSL, and may emit light based on the external power supply voltage EXT_ELVDD.

Further, in some embodiments, the display device 100 may provide the internal power supply voltage INT_ELVDD to the plurality of pixels PX during a sensing period in which the sensing circuit 140 senses the characteristics of the plurality of pixels PX. For example, as illustrated in FIG. 5, the controller 150 may activate a sensing enable signal EN in the sensing period SENP, and the display device 100 may perform a sensing operation that senses the characteristics of the plurality of pixels PX while the sensing enable signal EN is activated. In some embodiments, the controller 150 may activate the sensing enable signal EN in response to a power-off signal received from the host device 200, and the sensing operation may be performed when the display device 100 is powered off, but is not limited thereto. In the sensing period SENP, the controller 150 may activate the low-dropout enable signal LDO_EN, and the low-dropout circuit 160 may provide the internal power supply voltage INT_ELVDD to the power supply line PSL in response to the activated low-dropout enable signal LDO_EN. Further, in the sensing period SENP, the controller 150 may deactivate the load switch enable signal LSW_EN, and the load switch circuit 170 may reduce, block, or prevent the external power supply voltage EXT_ELVDD being provided to the power supply line PSL in response to the deactivated load switch enable signal LSW_EN. Accordingly, in the sensing period SENP, the internal power supply voltage INT_ELVDD having the relatively small ripple, rather than the external power supply voltage EXT_ELVDD having the relatively large ripple, may be provided to the plurality of pixels PX. Thus, a sensing noise may be reduced, and the sensing operation may be accurately performed.

Further, in the display device 100 according to embodiments, when the abnormal event of the display panel 110 occurs while the display panel 110 displays an image, supply of power to the plurality of pixels PX may be rapidly cut off. In some embodiments, the abnormal event of the display panel 110 may be any event in which it is suitable that an operation of the display device 100 be stopped. For example, the abnormal event of the display panel 110 may include, but is not limited to, an overcurrent of the display panel 110.

As illustrated in FIG. 6A, in a case where the display device 100 does not include the load switch circuit 170 for blocking the external power supply voltage EXT_ELVDD from being provided to the power supply line PSL, or in a case where the external power supply circuit 240 of the host device 200 is directly connected to the power supply line PSL of the display panel 110, when the abnormal event ERR_EVT of the display panel 110 occurs, the controller 150 may transfer an abnormal signal SERR indicating that an abnormal event ERR_EVT has occurred to the host processor 220 of the host device 200, and the host processor 220 may control the external power supply circuit 240 to deactivate the external power supply voltage EXT_ELVDD in response to the abnormal signal SERR. Thus, even if the display device 100 detects the abnormal event ERR_EVT of the display panel 110, because the display device 100 does not directly control the external power supply voltage EXT_ELVDD, as illustrated in FIG. 6B, a delay time TDLY may exist between a time point of occurrence of the abnormal event ERR_EVT and a time point of deactivation of the external power supply voltage EXT_ELVDD. Accordingly, in the case where the display device 100 does not include the load switch circuit 170, if the abnormal event ERR_EVT of the display panel 110 occurs, the display panel 110 may be damaged because the activated external power supply voltage EXT_ELVDD is supplied to the display panel 110 during the delay time TDLY.

However, as illustrated in FIG. 7A, in the display device 100 according to embodiments including the load switch circuit 170 between the external power supply circuit 240 and the power supply line PSL of the display panel 110, when the abnormal event ERR_EVT of the display panel 110 occurs, the controller 150 not only may transfer the abnormal signal SERR indicating that the abnormal event ERR_EVT has occurred to the host processor 220, but also may deactivate the load switch enable signal LSW_EN as illustrated in FIG. 7B. The load switch circuit 170 may reduce, block, or prevent the external power supply voltage EXT_ELVDD being provided to the power supply line PSL in response to the deactivated load switch enable signal LSW_EN, and a voltage of the power supply line PSL of the display panel 110 may be rapidly deactivated (e.g., to the ground voltage VGND). Accordingly, in the display device 100 according to embodiments, even if the external power supply voltage EXT_ELVDD is deactivated after the delay time TDLY from the time point of occurrence of the abnormal event ERR_EVT of the display panel 110, the load switch circuit 170 may reduce, block, or prevent the external power supply voltage EXT_ELVDD being provided to the power supply line PSL of the display panel 110 immediately upon the occurrence of the abnormal event ERR_EVT, thereby rapidly cutting off supplying power to the plurality of pixels PX and reducing or preventing the damage to the display panel 110.

As described above, in the display device 100 according to embodiments, in the power-on period POP, the low-dropout circuit 160 may be enabled, the external power supply voltage EXT_ELVDD may not be provided to the power supply line PSL, and the overcurrent detection operation for the display panel 110 may be normally performed. Further, in the sensing period SENP, the internal power supply voltage INT_ELVDD having the relatively small ripple instead of the external power supply voltage EXT_ELVDD having the relatively large ripple may be provided to the power supply line PSL, and the sensing operation may be accurately performed. Further, when the abnormal event ERR_EVT of the display panel 110 occurs, the external power supply voltage EXT_ELVDD may be reduced or blocked to the power supply line PSL, and the damage to the display panel 110 may be reduced or prevented.

Figure 8:
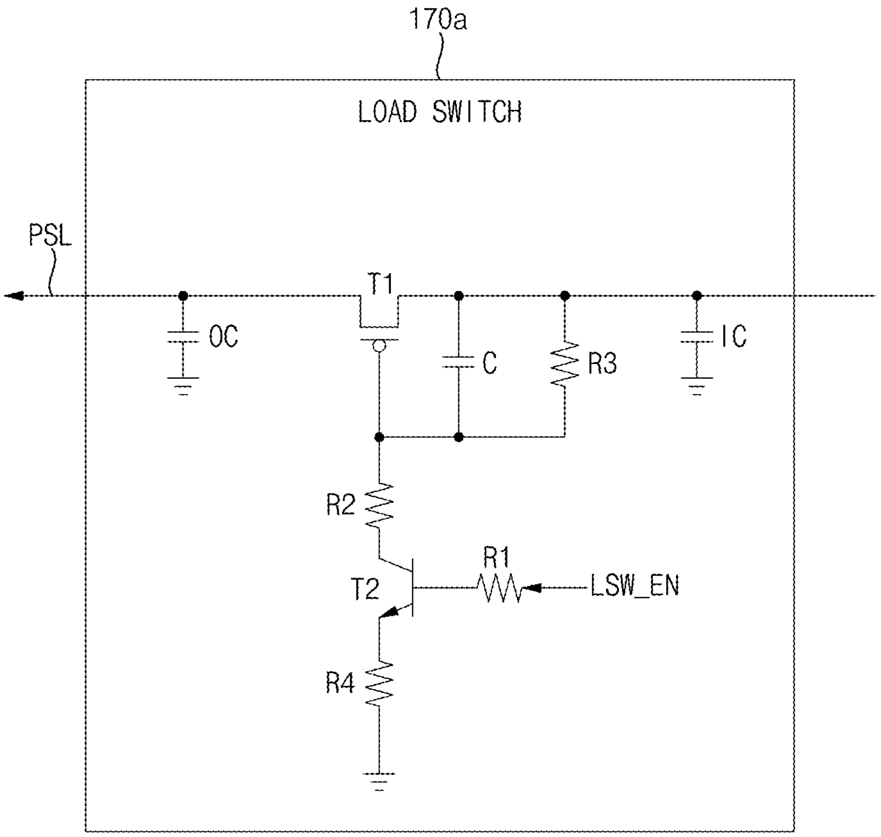
FIG. 8 is a circuit diagram illustrating a load switch included in a display device according to embodiments.

FIG. 8 is a circuit diagram illustrating a load switch included in a display device according to embodiments.

Referring to FIG. 8, a load switch circuit 170*a* may include a first transistor T1, a second transistor T2, a first resistor R1, a second resistor R2, a third resistor R3, a fourth resistor R4 and a capacitor C. In some embodiments, the load switch circuit 170*a* may further include at least one input capacitor IC connected to an external power supply circuit, and/or at least one output capacitor OC connected to a power supply line PSL.

The first transistor T1 may be connected between the power supply line PSL and the external power supply circuit. When the first transistor T1 is turned on, the first transistor T1 may transfer an external power supply voltage generated by the external power supply circuit to the power supply line PSL of a display panel. When the first transistor T1 is turned off, the first transistor T1 may reduce or block the external power supply voltage otherwise provided to the power supply line PSL. In some embodiments, the first transistor T1 may include a control electrode (e.g., a gate) connected to the second resistor R2, a first terminal (e.g., a source) connected to the external power supply circuit, and a second terminal (e.g., a drain) connected to the power supply line PSL.

The capacitor C may be connected between the first terminal of the first transistor T1 and the second resistor R2. The third resistor R3 may be connected in parallel with the capacitor C between the first terminal of the first transistor T1 and the second resistor. For example, the capacitor C and the third resistor R3 may be connected in parallel between the gate and the source of the first transistor T1.

The second transistor T2 may selectively turn on the first transistor T1 in response to a load switch enable signal LSW_EN. In some embodiments, the second transistor T2 may include a control electrode (e.g., a base), which receives the load switch enable signal LSW_EN through the first resistor R1, a first terminal (e.g., a collector) connected to the second resistor R2, and a second terminal (e.g., an emitter), which receives a ground voltage through the fourth resistor R4.

The first resistor R1 may include a first terminal, which receives the load switch enable signal LSW_EN, and a second terminal connected to the control electrode of the second transistor T2. Thus, a current corresponding to the load switch enable signal LSW_EN may be provided to the control electrode of the second transistor T2 through the first resistor R1. Further, the second resistor R2 may be connected between the first terminal of the second transistor T2 and the control electrode of the first transistor T1. The fourth resistor R4 may be connected between the second terminal of the second transistor T2 and the ground voltage.

In some embodiments, as illustrated in FIG. 8, the first transistor T1 may be a P-type metal oxide semiconductor ("PMOS") transistor, and the second transistor T2 may be an N-type bipolar junction transistor ("BJT"), but is not limited thereto.

Figure 9:
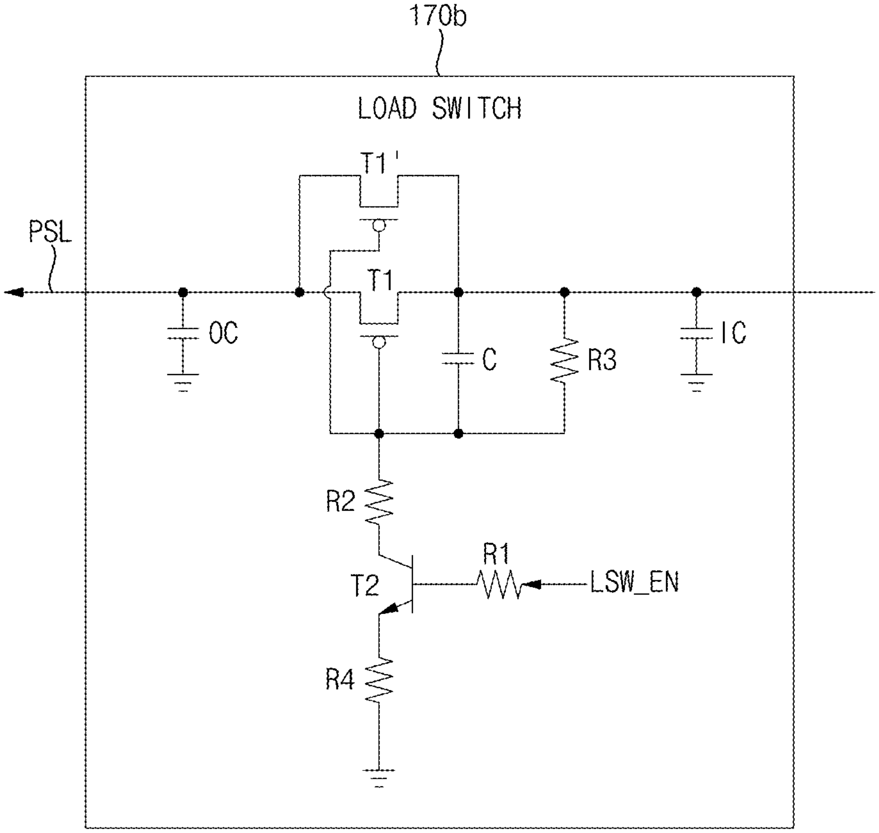
FIG. 9 is a circuit diagram illustrating a load switch included in a display device according to embodiments.

FIG. 9 is a circuit diagram illustrating a load switch included in a display device according to embodiments.

Referring to FIG. 9, a load switch circuit 170*b* may include a plurality of first transistors T1 and T1', a second transistor T2, a first resistor R1, a second resistor R2, a third resistor R3, a fourth resistor R4, a capacitor C, an input capacitor IC and an output capacitor OC. The load switch circuit 170*b* of FIG. 9 may have substantially the same configuration as a load switch circuit 170*a* of FIG. 8, except that the load switch circuit 170*b* may include the plurality of first transistors T1 and T1' connected in parallel between a power supply line PSL and an external power supply circuit.

The second transistor T2 may selectively turn on the plurality of first transistors T1 and T1' in response to a load switch enable signal LSW_EN. For example, when the load switch enable signal LSW_EN is deactivated, the second transistor T2 may turn off the plurality of first transistors T1 and T1', and the plurality of first transistors T1 and T1' may block or reduce the external power supply voltage generated by the external power supply circuit being provided to the power supply line PSL. In contrast, when the load switch enable signal LSW_EN is activated, the second transistor T2 may turn on the plurality of first transistors T1 and T1', and the plurality of first transistors T1 and T1' may provide the external power supply voltage generated by the external power supply circuit to the power supply line PSL. In some embodiments, the number of the plurality of first transistors connected in parallel may be determined according to an amount of current flowing through the power supply line PSL. For example, when the display panel suitably uses a larger current through the power supply line PSL, the number of the plurality of first transistors may be increased.

Figure 10:
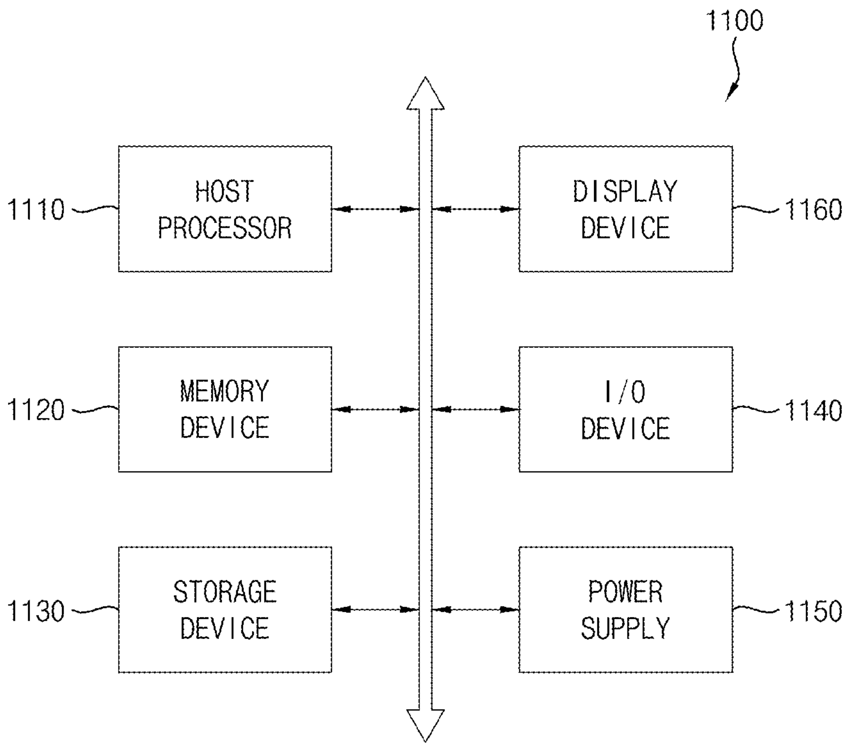
FIG. 10 is a block diagram illustrating an electronic device including a display device according to embodiments.

FIG. 10 is a block diagram illustrating an electronic device including a display device according to embodiments.

Referring to FIG. 10, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a low-dropout circuit may provide an internal power supply voltage to a power supply line in response to a low-dropout enable signal, and a load switch circuit may selectively provide an external power supply voltage to the power supply line in response to a load switch enable signal. Accordingly, while the low-dropout circuit provides the internal power supply voltage to a plurality of pixels, the external power supply voltage provided from the external power supply circuit may be reduced or blocked.

The disclosed embodiments may be applied any electronic device 1100 including the display device 1160. For example, the disclosed embodiments may be applied to a mobile phone, a smart phone, a virtual reality ("VR") device, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc.

The electronic device according to one or more embodiments may be a device that displays a moving image and/or a still image. For example, the display device 100 of FIG. 1 may be applied to portable electronic devices such as mobile phones, smartphones, tablet personal computers (PCs), mobile communication terminals, electronic notebooks, electronic books, portable multimedia players (PMPs), navigations, and ultra-mobile PCs (UMPCs). For example, the display device 100 may be applied to a display unit of a television, a laptop computer, a monitor, a billboard, or the Internet of Things (IoT). Alternatively, in one or more embodiments, the display device 10 may be applied to a smartwatch, a watch phone, and/or a head-mounted display device (HMD) for implementing virtual reality and/or augmented reality.

The foregoing is illustrative of embodiments and is not to be construed as limiting thereof. Although a few embodiments have been described, those skilled in the art will readily appreciate that many modifications are possible in the embodiments without materially departing from the novel teachings of the present disclosure. Accordingly, all such modifications are intended to be included within the scope of the present disclosure. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, with functional equivalents thereof to be included therein.

What is claimed is:

1. A display device comprising:

a display panel comprising pixels;

a low-dropout circuit configured to generate an internal power supply voltage in response to a low-dropout enable signal, and to provide the internal power supply voltage to the pixels through a power supply line;

a load switch circuit configured to receive an external power supply voltage, and to selectively provide the external power supply voltage to the power supply line in response to a load switch enable signal; and a controller configured to generate the low-dropout enable signal and the load switch enable signal, wherein the load switch circuit comprises:

first transistors connected in parallel between the power supply line and an external power supply circuit configured to generate the external power supply voltage; and a second transistor configured to selectively turn on the first transistors in response to the load switch enable signal.

2. The display device of claim 1, wherein the controller is configured to activate the low-dropout enable signal in a power-on period of the display device, and wherein the low-dropout circuit is configured to provide the internal power supply voltage to the power supply line in response to the activated low-dropout enable signal, and to perform an overcurrent detection operation for determining whether a current flowing through the power supply line is greater than or equal to a reference current.

3. The display device of claim 2, wherein the controller is configured to deactivate the load switch enable signal in the power-on period, and wherein the load switch circuit is configured to reduce or block the external power supply voltage to the power supply line in response to the deactivated load switch enable signal.

4. The display device of claim 2, wherein the controller is configured to deactivate the low-dropout enable signal, and is configured to activate the load switch enable signal, in a driving period after the power-on period, wherein the low-dropout circuit is configured to reduce or block the internal power supply voltage to the power supply line in response to the deactivated low-dropout enable signal, wherein the load switch circuit is configured to provide the external power supply voltage to the power supply line in response to the activated load switch enable signal, and wherein the pixels are configured to receive the external power supply voltage through the power supply line, and to emit light based on the external power supply voltage.

5. The display device of claim 1, wherein the controller is configured to activate the low-dropout enable signal in a sensing period in which characteristics of the pixels are sensed, and wherein the low-dropout circuit is configured to provide the internal power supply voltage to the power supply line in response to the activated low-dropout enable signal.

6. The display device of claim 5, wherein the controller is configured to deactivate the load switch enable signal in the sensing period, and wherein the load switch circuit is configured to reduce or block the external power supply voltage to the power supply line in response to the deactivated load switch enable signal.

7. The display device of claim 5, further comprising a sensing circuit connected to the pixels through sensing lines, and configured to sense the characteristics of the pixels in the sensing period.

8. The display device of claim 1, wherein the controller is configured to deactivate the load switch enable signal in response to an abnormal event of the display panel being detected, and wherein the load switch circuit is configured to reduce or block the external power supply voltage to the power supply line in response to the deactivated load switch enable signal.

9. The display device of claim 8, wherein the abnormal event comprises an overcurrent of the display panel.

10. The display device of claim 1, wherein each of the first transistors comprises a P-type metal oxide semiconductor (PMOS) transistor, and wherein the second transistor comprises an N-type bipolar junction transistor (BJT).

11. The display device of claim 1, wherein the load switch circuit further comprises:

a first resistor comprising a first terminal configured to receive the load switch enable signal, and a second terminal connected to a control electrode of the second transistor;

a second resistor connected between a first terminal of the second transistor and a control electrode of each of the first transistors;

a capacitor connected between a first terminal of each of the first transistors and the second resistor; and a third resistor connected in parallel with the capacitor.

12. The display device of claim 11, wherein each of the first transistors comprises the control electrode connected to the second resistor, the first terminal connected to the external power supply circuit, and a second terminal connected to the power supply line, and wherein the second transistor comprises the control electrode connected to the first resistor, the first terminal connected to the second resistor, and a second terminal configured to receive a ground voltage.

13. The display device of claim 1, wherein the external power supply circuit comprises a switching mode power supply (SMPS) circuit in a host device.

14. The display device of claim 1, wherein a number of the first transistors corresponds to an amount of current flowing through the power supply line.

15. A display device comprising:

a display panel comprising pixels;

a low-dropout circuit configured to generate an internal power supply voltage in response to a low-dropout enable signal, and to provide the internal power supply voltage to the pixels through a power supply line;

a load switch circuit configured to receive an external power supply voltage, and to selectively provide the external power supply voltage to the power supply line in response to a load switch enable signal, and comprising:

a first transistor comprising a control electrode, a first terminal connected to an external power supply circuit configured to generate the external power supply voltage, and a second terminal connected to the power supply line;

a first resistor;

a second transistor comprising a control electrode configured to receive the load switch enable signal through the first resistor, a first terminal, and a second terminal configured to receive a ground voltage;

a second resistor connected between the first terminal of the second transistor and the control electrode of the first transistor;

a capacitor connected between the first terminal of the first transistor and the second resistor; and a third resistor connected in parallel with the capacitor; and a controller configured to generate the low-dropout enable signal and the load switch enable signal.

16. The display device of claim 15, wherein the controller is configured to activate the low-dropout enable signal, and is configured to deactivate the load switch enable signal, in a power-on period or a sensing period of the display device.

17. An electronic device comprising:

a host device comprising an external power supply circuit configured to generate an external power supply voltage; and a display device configured to receive input image data and the external power supply voltage from the host device, and comprising:

a display panel comprising pixels;

a low-dropout circuit configured to generate an internal power supply voltage in response to a low-dropout enable signal, and to provide the internal power supply voltage to the pixels through a power supply line;

a load switch circuit configured to receive the external power supply voltage, and to selectively provide the external power supply voltage to the power supply line in response to a load switch enable signal; and a controller configured to generate the low-dropout enable signal and the load switch enable signal, wherein the load switch circuit comprises:

first transistors connected in parallel between the power supply line and the external power supply circuit; and a second transistor configured to selectively turn on the first transistors in response to the load switch enable signal.

18. The electronic device of claim 17, wherein the controller is configured to activate the low-dropout enable signal, and is configured to deactivate the load switch enable signal, in a power-on period or a sensing period of the display device.

* * * * *